Patented June 5, 1945

2,377,734

UNITED STATES PATENT OFFICE 2,377,734

PROCESS FOR MAKING SYNTHETIC RESIN

Thomas C. Whitner, Elizabeth, N. J., assignor to Chemical Laboratories, Inc., a corporation of New Jersey No Drawing. Application August 6, 1942, Serial No. 453,878

8 Claims. (Cl. 260—64)

This invention relates to the condensation products of aliphatic aldehydes with aliphatic ketones and more particularly to the polymerization of such condensation products.

Interaction between an aliphatic aldehyde and an aliphatic ketone, e. g., between formaldehyde and acetone, can be effected in the presence of an inorganic alkaline contact agent or catalyst. The alkalinity of the inorganic agent and the proportion used in securing reaction determines to a large degree the properties and characteristics of the resulting product. Thus, a fairly large proportion of a strongly alkaline catalyst, such as sodium or potassium hydroxide, will furnish a hard, solid material which is substantially insoluble in water and in many organic solvents. Employment of a smaller proportion of such a strongly alkaline inorganic catalyst or the use of a less alkaline one, such as dipotassium hydrogen phosphate, trisodium phosphate or borax (sodium tetraborate), will give rise to condensation products which are soluble in water and in many organic solvents and oftentimes are thick, viscous, heavy liquids. These soluble materials, in turn, can be polymerized to hard, solid bodies by treatment with alkali metal hydroxides.

This invention has as an object the polymerization of the soluble condensation product of an aliphatic aldehyde with an aliphatic ketone to the insoluble variety. It also has as an object the use of organic alkaline compounds as the polymerizing or catalytic agents.

Although the soluble condensation products from reaction of an aldehyde with a ketone may be prepared, as mentioned above, when only a small proportion of a caustic alkali is employed, nevertheless in most cases I prefer to use a milder alkaline catalyst such as a di- or tri-alkali metal phosphate as employment of these latter catalysts is less likely to lead to the formation of a solid, insoluble product. Condensation may be effected by admixing appropriate quantities of ketone and aldehyde and then adding either the solid contact agent or a solution of it to the reaction mixture. If desired, the mixture of ketone and aldehyde may be diluted somewhat with water, or other inert solvent, before addition of the alkaline agent.

After interaction is complete, the reaction product may be freed of any undissolved catalyst, for example, by filtration. If a relatively large quantity of water was employed as a diluent for the reactants, then a very substantial proportion or even all of the catalyst may remain dissolved in the liquid reaction product. Evaporation of the diluent, of course, will effect precipitation (either in whole or in part) of the dissolved contact agent and the latter may be separated by filtration.

In some instances it may be desirable to eliminate the catalyst, particularly the dissolved portion, as completely as possible. In the case of caustic alkalies, this can be accomplished by adding the requisite quantity of an aqueous solution of an acid, say, hydrochloric or sulfuric, and thereby rendering the liquid reaction product substantially neutral. When an alkali metal phosphate is employed as the catalyst, it can be removed (after completion of the reaction) by the addition of the necessary quantity of an aqueous solution of an alkaline-earth metal salt, e. g., barium chloride or calcium sulfate.

After removal of the catalyst, the liquid reaction product may be freed of most or all of the water (or other liquid diluent) remaining therein by evaporation, distillation under reduced pressure, or any other convenient procedure. Some salt may precipitate during removal of the liquid and this insoluble material can be separated by filtration.

For polymerizing the soluble aldehyde-ketone condensation product (prepared as indicated above) into an insoluble resinous material, I treat it with an alkylolammonium hydroxide, as the alkaline contact agent. Examples of such agents are tetraethanol ammonium hydroxide, tetrapropanol ammonium hydroxide, and tetrabutanol ammonium hydroxide, and the like. One procedure for effecting polymerization comprises mixing a solution of the alkylolammonium hydroxide with the aldehyde-ketone condensation product and permitting the mixture to stand at room temperature until conversion into a resinous mass has occurred. Another procedure comprises mixing the condensation product and a solution of the alkylol derivative and heating the mixture to a slightly elevated temperature. In the latter instance, temperatures of 50° to 60° C. up to 100° C., or thereabouts, have proven adequate.

The resulting product is a light colored solid mass which is translucent (if the thickness is not too great), apparently insoluble or only very slightly soluble in water and in many organic solvents such as alcohol, glycerol, acetone, benzene, kerosene and the like. In fact the polymerized material may be broken or ground into fine particles and washed with either hot or cold water to free them (the particles) of catalyst or unreacted ingredients.

The resinous bodies prepared at room or atmospheric temperature are at first soft and flexible and in physical appearance resemble some types of factice. Those bodies made at the higher temperatures are harder and less flexible and even brittle. If the materials obtained at the lower temperatures are permitted to stand for some time or are subjected to a mild heating operation, they are changed into the harder and more brittle varieties.

The following examples will serve to illustrate my invention. Unless otherwise mentioned, all parts are by weight.

*Example 1.*—Soluble condensation product from formaldehyde and acetone was prepared in the following manner: 15 parts of formaldehyde (as trioxymethylene) were admixed with 15 parts of acetone dissolved in 15 parts of water. Approximately 1 part of trisodium phosphate dissolved in a small quantity of water was added. The mixture, placed in a container having a reflux condenser attached, was warmed gently until reaction began and interaction was permitted to continue (without further external heating) until all boiling or bubbling of the mixture ceased. The liquid product then was heated on a boiling water bath for a short time, removed and allowed to cool to room temperature and remain at this temperature over night.

To the liquid product prepared in this manner, after dilution with a small quantity of water, was added slowly an aqueous solution of barium chloride until a precipitate of barium phosphate ceased to form. During addition of the barium salt, the liquid product was tested from time to time for acidity, and sufficient aqueous sodium hydroxide was added as necessary to keep the pH at substantially 7.

Precipitated barium phosphate was separated by filtration, and the clear solution of condensation product was heated on a boiling water bath until the greater portion of volatile substances was removed and a thick, viscous, heavy liquid admixed with some precipitated salt was secured. Filtration of this viscous liquid eliminated the salt.

*Example 2.*—A portion of the condensation product, as prepared in Example 1, was admixed with tetraethanol ammonium hydroxide in the ratio of 13.9 parts of the former to 1 part of the latter. The ethanol derivative was added as a 40 per cent solution in aqueous alcohol. The liquid mixture was heated slowly and when a temperature of 50° to 60° C. was reached it changed to a solid body. The latter was translucent and brittle and could be broken into small pieces which were washed with hot water to eliminate unreacted ingredients.

*Example 3.*—The liquid condensation product, as prepared in Example 1, was admixed with tetraethanol ammonium hydroxide in the ratio of 5.09 parts of the former to 1 part of the latter (in aqueous alcoholic solution). The mixture was allowed to remain in an open container at room temperature for 24 hours. At the end of this time a solid, translucent mass was obtained, which was soft and could be crumbled readily between the fingers and resembled in physical appearance some types of factice. It was washed with cold water to remove unreacted ingredients.

*Example 4.*—When the material, as prepared in Example 3, was permitted to stand for some time at room temperature it became hard and brittle and resembled the product as made in Example 2.

This change to a hard, brittle product could be accelerated by the application of heat. Thus, a small sample of the soft product from Example 3, was placed in an oven and the temperature raised slowly over a period of 15 minutes to 110°-115° C., and then maintained so for 10 minutes. The sample of material then was permitted to cool to room temperature and it was noted that a hard, brittle mass (somewhat darker in color) had been formed.

*Example 5.*—A condensation product was made by using 15 parts of acetone admixed with 5 parts of water, 15 parts of formaldehyde (as trioxymethylene) and 1 part of disodium hydrogen phosphate and 0.25 part of trisodium phosphate. After reaction was completed, the liquid product was filtered from any undissolved catalyst and concentrated on a boiling water bath. It then was cooled to room temperature and any insoluble material was removed by filtration. The viscous liquid secured in this manner gave a very positive test for the presence of dissolved phosphates.

*Example 6.*—A portion of the product, from Example 5, was admixed with tetraethanol ammonium hydroxide in the ratio of 15.8 parts of the former to 1 part of the latter (in a 40 per cent solution in aqueous alcohol), and the mixture heated slowly to a temperature of 60° C. The product in this instance was a soft, factice-like material. It was washed well with cold water to remove unreacted ingredients.

The factice-like material was permited to remain exposed at room temperature to the atmosphere, and during a period of 24 hours it changed to a hard, brittle, very light colored substance.

*Example 7.*—A water-soluble condensation product was made by reacting 21 parts of formaldehyde (as trioxymethylene) with 21 parts of methyl ethyl ketone, using 1 part of trisodium phosphate dissolved in 5 parts of water as the condensing agent. A clear liquid product was secured and this was separated by decantation from any undissolved catalyst. The liquid was dissolved in about twice its volume of water, and aqueous barium chloride was added slowly until all phosphate had been precipitated. During the latter operation the pH of the solution was kept at substantially 7 by the addition of aqueous sodium hydroxide. The insoluble barium phosphate was separated by filtration, and the filtrate was concentrated on a boiling water bath. After cooling the concentrated liquid, it was separated by filtration from any salts which did not remain in solution.

*Example 8.*—A portion of the liquid, as made in Example 7, was admixed with tetraethanol ammonium hydroxide in the proportion of 6.5 parts of the former to 1 part of the latter (dissolved in aqueous alcohol). The mixture was heated at a temperature of 110° to 115° C. for 20 minutes, and then cooled to room temperature. The resinous product was broken up, washed well with cold water, filtered and air dried. A light gray colored powder was obtained.

From the foregoing disclosures it will be seen that my invention involves polymerization of the soluble condensation product of an aliphatic aldehyde with an aliphatic ketone to a water-insoluble resinous product. Aldehydes which are suitable for my purpose include formaldehyde, acetaldehyde, propionaldehyde, butyraldehyde and the like. Examples of the ketones which are applicable are acetone, diethyl ketone, methyl ethyl ketone and methyl propyl ketone. As the polymerizing agent I prefer to employ a tetra-alkylol ammonium hydroxide, as for example, tetraethanol, tetrapropanol and tetrabutanol ammonium hydroxide.

Polymerization may be effected either at room temperature, say 15° to 20° C., or by heating to somewhat higher temperatures, such as 100° C., or even as high as 150° C. The period of heating as well as the temperature will depend upon the particular condensation product and the quantity of it undergoing treatment. Unduly high temperatures and also unnecessarily prolonged periods should be avoided.

Contact agents which can be employed in the preparation of the soluble condensation products include alkali metal hydroxides (e. g., sodium or potassium hydroxide), alkaline-earth metal oxides or hydroxides (such as calcium oxide or barium hydroxide), and alkali metal phosphates and borates (for example, trisodium phosphate and sodium tetraborate). Although polymerization of the soluble aliphatic aldehyde-ketone condensation product can be effected when a small proportion of the contact agent remains dissolved therein, nevertheless I have noted that polymerization takes place more readily if such condensation agents are eliminated. In the case of soluble metal hydroxides, such as those of sodium or calcium, removal may be accomplished by neutralization with an acid, e. g., an aqueous solution of sulfuric or hydrochloric acid. When alkali metal phosphates are the catalysts of condensation they may be precipitated from the reaction product as insoluble alkaline earth phosphates.

What I claim is:

1. The process which comprises polymerizing a liquid water-soluble condensation product of a saturated aliphatic aldehyde with a saturated aliphatic ketone to a water-insoluble solid product with an alkaline catalyst consisting of a tetraalkylol ammonium hydroxide, condensation of said aldehyde with said ketone having been effected in an aqueous solution of an inorganic alkaline catalyst while maintaining the temperature and the alkalinity of said aqueous solution and the duration of reaction of said aldehyde with said ketone as great as that required to produce substantially only a liquid water-soluble condensation product after concentrating the aqueous reaction mixture at a temperature of about 100° C. and at atmospheric pressure.

2. The process which comprises polymerizing a liquid water-soluble condensation product of formaldehyde with a saturated aliphatic ketone to a water-insoluble solid product with an alkaline catalyst consisting of a tetra-alkylol ammonium hydroxide, condensation of formaldehyde with said ketone having been effected in an aqueous solution of an inorganic alkaline catalyst while maintaining the temperature and the alkalinity of said aqueous solution and the duration of reaction of formaldehyde with said ketone as great as that required to produce substantially only a liquid water-soluble condensation product after concentrating the aqueous reaction mixture at a temperature of about 100° C. and at atmospheric pressure.

3. The process which comprises polymerizing a liquid water-soluble condensation product of a saturated aliphatic aldehyde with acetone to a water-insoluble solid product with an alkaline catalyst consisting of a tetra-alkylol ammonium hydroxide, condensation of said aldehyde with acetone having been effected in an aqueous solution of an inorganic alkaline catalyst while maintaining the temperature and the alkalinity of said aqueous solution and the duration of reaction of said aldehyde with acetone as great as that required to produce substantially only a liquid water-soluble condensation product after concentrating the aqueous reaction mixture at a temperature of about 100° C. and at atmospheric pressure.

4. The process which comprises polymerizing a liquid water-soluble condensation product of formaldehyde with acetone to a water-insoluble solid product with an alkaline catalyst consisting of tetraethanol ammonium hydroxide, condensation of formaldehyde with acetone having been effected in an aqueous solution of an inorganic alkaline catalyst while maintaining the temperature and the alkalinity of said aqueous solution and the duration of reaction of formaldehyde with acetone as great as that required to produce substantially only a liquid water-soluble condensation product after concentrating the aqueous reaction mixture at a temperature of about 100° C. and at atmospheric pressure.

5. The process which comprises polymerizing a liquid water-soluble condensation product of formaldehyde with acetone to a water-insoluble solid product with an alkaline catalyst consisting of tetraethanol ammonium hydroxide, condensation of formaldehyde with acetone having been effected in an aqueous solution of an inorganic alkaline catalyst while maintaining the temperature and the alkalinity of said aqueous solution and the duration of reaction of formaldehyde with acetone as great as that required to produce substantially only a liquid water-soluble condensation product after concentrating the aqueous reaction mixture at a temperature of about 100° C. and at atmospheric pressure after removing substantially all of said inorganic alkaline catalyst.

6. The process which comprises polymerizing a liquid water-soluble condensation product of formaldehyde with acetone to a water-insoluble solid product with an alkaline catalyst consisting of tetraethanol ammonium hydroxide at a temperature not exceeding 150° C., condensation of formaldehyde with acetone having been effected in an aqueous solution of an inorganic alkaline catalyst while maintaining the temperature and the alkalinity of said aqueous solution and the duration of reaction of formaldehyde with acetone as great as that required to produce substantially only a liquid water-soluble condensation product after concentrating the aqueous reaction mixture at a temperature of about 100° C. and at atmospheric pressure.

7. The process which comprises polymerizing a liquid water-soluble condensation product of formaldehyde with acetone to a water-insoluble solid product with an alkaline catalyst consisting of tetraethanol ammonium hydroxide and maintaining the temperature during polymerization at substantially atmospheric temperature, condensation of formaldehyde with acetone having been effected in an aqueous solution of an inorganic alkaline catalyst while maintaining the temperature and the alkalinity of said aqueous solution and the duration of reaction of formaldehyde with acetone as great as that required to produce substantially only a liquid water-soluble condensation product after concentrating the aqueous reaction mixture at a temperature of about 100° C. and at atmospheric pressure.

8. The process which comprises polymerizing a liquid water-soluble condensation product of formaldehyde with acetone to a water-insoluble solid product with an alkaline catalyst consisting of a tetra-alkylol ammonium hydroxide, condensation of formaldehyde with acetone having been effected in an aqueous solution of an inorganic alkaline catalyst while maintaining the temperature and the alkalinity of said aqueous solution and the duration of reaction of formaldehyde with acetone as great as that required to produce substantially only a liquid water-soluble condensation product after concentrating the aqueous reaction mixture at a temperature of about 100° C. and at atmospheric pressure after removing substantially all of said inorganic alkaline catalyst.

THOMAS C. WHITNER.